(12) United States Patent
Morita et al.

(10) Patent No.: US 8,511,237 B2
(45) Date of Patent: Aug. 20, 2013

(54) GUIDEWAY ELECTRIC VEHICLE MOUNTED WITH BATTERIES

(75) Inventors: Katsuaki Morita, Hiroshima (JP); Masaya Mitake, Hiroshima (JP); Mitsuaki Hoshi, Mihara (JP); Kousuke Katahira, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 372 days.

(21) Appl. No.: 12/312,910

(22) PCT Filed: Apr. 18, 2008

(86) PCT No.: PCT/JP2008/058004
§ 371 (c)(1),
(2), (4) Date: Jun. 23, 2009

(87) PCT Pub. No.: WO2009/011162
PCT Pub. Date: Jan. 22, 2009

(65) Prior Publication Data
US 2009/0320715 A1  Dec. 31, 2009

(51) Int. Cl.
*B61C 3/00* (2006.01)
*B60K 1/00* (2006.01)

(52) U.S. Cl.
USPC ........................................... 105/51; 180/65.1

(58) Field of Classification Search
USPC .................. 105/49–51; 180/65.1, 68.1, 68.5
See application file for complete search history.

(56) References Cited

U.S. PATENT DOCUMENTS

| | | | | |
|---|---|---|---|---|
| 4,135,593 A * | 1/1979 | Fowkes | ........................ | 180/65.1 |
| 7,079,379 B2 * | 7/2006 | Yamaguchi et al. | .......... | 361/676 |
| 7,353,900 B2 * | 4/2008 | Abe et al. | ..................... | 180/68.5 |
| 7,823,671 B2 * | 11/2010 | Inoue et al. | .................. | 180/68.4 |
| 2001/0037747 A1 | 11/2001 | Svensson | | |
| 2007/0072061 A1 * | 3/2007 | Shimizu | ........................ | 429/62 |
| 2010/0170735 A1 | 7/2010 | Nakamura | | |

FOREIGN PATENT DOCUMENTS

| | | |
|---|---|---|
| JP | S56-157662 | 12/1981 |
| JP | S63-145123 | 6/1988 |
| JP | H05-178070 | 7/1993 |
| JP | H07-292602 | 11/1995 |
| JP | H08-225076 | 9/1996 |
| JP | 3035023 | 12/1996 |
| JP | 2000-350411 | 12/2000 |

(Continued)

*Primary Examiner* — R. J. McCarry, Jr.
(74) *Attorney, Agent, or Firm* — Manabu Kanesaka; Kenneth M. Berner; Benjamin J. Hauptman

(57) ABSTRACT

Structure for mounting batteries in a guideway electric vehicle driven by a battery-driven motor is provided, with which balancing in weight of the vehicle is properly achieved, batteries can be cooled enough, battery rooms are completely sealed from the passenger room, and running stability of the vehicle is ensured.

The battery mounting structure is composed such that battery rooms (35) for mounting battery modules (33) comprised of a plurality of batteries are formed on a floor (9) of the vehicle in both sides adjacent side walls (11) of the vehicle respectively, each of the battery rooms (35) being partitioned from the passenger cabin of the vehicle hermetically by a partition plate (37); suction openings (41) for introducing outside air into the battery room (35) are provided in the floor (9) or side wall (11) of the vehicle in each battery room (35), and exhaust openings (41) for releasing air to the outside of the vehicle are provided in the side wall (11) thereof in each battery room (35); whereby the battery module (33) in each battery room (35) can be cooled by outside air.

11 Claims, 13 Drawing Sheets

(56) References Cited

FOREIGN PATENT DOCUMENTS

| | | |
|---|---|---|
| JP | 2001-310733 | 11/2001 |
| JP | 2002-370643 | 12/2002 |
| JP | 2003-079003 | 3/2003 |
| JP | 2003-284623 | 10/2003 |
| JP | 2004-066889 | 3/2004 |
| JP | 2001-101698 | 4/2006 |
| JP | 2006-101698 | 4/2006 |
| JP | 2006-192969 | 7/2006 |
| JP | 2006-246568 | 9/2006 |
| JP | 2007-182208 | 7/2007 |
| JP | 2008-62680 | 3/2008 |
| JP | 2008-068652 | 3/2008 |
| JP | 2009-073439 | 4/2009 |
| JP | 2009-161122 | 7/2009 |
| JP | 2009-165315 | 7/2009 |

* cited by examiner (a)

(b)

(c)

(a)

(b)

(c)

GUIDEWAY ELECTRIC VEHICLE MOUNTED WITH BATTERIES

TECHNICAL FIELD

The present invention relates to structure for mounting batteries for supplying electric power to an electric motor in a guideway electric vehicle which runs on guide ways such as tramways, elevated guide ways, exclusive railroads, and so on.

BACKGROUND ART

Electric vehicles driven by electric power supplied from a battery unit have prevailed in recent years. The battery is heavy in weight and cooling thereof is necessary, and place and structure for mounting batteries in the vehicles have been studied and proposed.

Conventionally, electric power is supplied to the vehicles via an overhead wire provided along the guideway. However, in a new transit system in which electric vehicles with rubber-tired wheels run on guide ways provided with guide rails, a power supply system without overhead wire is demanded from the viewpoint of simplification of the power supply system, and in the case of battery driven electric vehicle, improvement concerning structure and place of mounting batteries in the vehicle is required.

Battery location in electric vehicles including passenger cars, passenger buses, and trucks is disclosed for example in Japanese Laid-Open Patent Application No. 2004-66889 (patent literature 1) and Japanese Patent No. 3149493 (patent literature 2).

According to the patent literature 1, as shown in FIG. 20, a buttery unit 02 is mounted on a roof 03 of an electric autobus 01 driven by the battery unit at a position directly above the front axle so that loads on rear axle 05 and front axle 04 are balanced when vehicle drive devices such as an electric motor and others are mounted in the rear of the vehicle, thereby ensuring running stability and improving cooling of the batteries by air relatively flowing against the vehicle as the vehicle runs.

According to the patent literature 2, as shown in FIG. 21, batteries 010 are accommodated in an elongated duct 011 extending in longitudinal direction of the car below the seats, the elongated duct 011 is connected to an air conditioning unit 012 at its front end and to opens of the rear space in the car at its rear opening 013. Air in the car room is ingested from the rear opening 013, heated by the batteries 010, and the heated air heated by cooling the batteries 010 is introduced to the air conditioning unit 012 and heated to be supplied into the car room.

With the prior art of the patent literature 1, it is necessary to increase mechanical strength of the vehicle body including the roof 03 because heavy batteries are mounted on the roof 03, which induces a problem of increased vehicle weight. Further, height of center of gravity of the vehicle increases by mounting the batteries on the roof 03, resulting deteriorated running stability.

With the prior art of the patent literature 2, air in the car room is taken in from the rear opening 013 to be used to cool the batteries 010, therefore battery room can not be sealed from the car room, and there is fear that the car room is subjected to the influence of battery electrolyte and inflammable gas developed from the battery electrolyte.

Further, in a new transit system in which electric vehicles with rubber-tired wheels run on guide ways, the batter driven vehicle is provided with vehicle control devices and cables under the floor, and it is difficult to secure enough space for mounting batteries. In order to secure enough space for mounting batteries, it is necessary to modify vehicle construction, and design must be considerably changed from that of a conventional vehicle which is driven by electric power receiving from an outside electric power source.

Further, as the electric vehicle used in the new transit system is generally large sized as compared with passenger cars, trucks, and passenger buses, large electric power must be supplied to drive their electric motors. Therefore, large capacity of battery unit is required, total weight and volume of the batteries increase to a large extent, and large space for mounting the batteries is needed. Therefore, it is not easy to secure proper space for accommodating batteries in the vehicle.

DISCLOSURE OF THE INVENTION

The present invention was made in light of the background, and object of the invention is to provide a structure for mounting batteries in a guideway electric vehicle which is driven by a battery-operated motor and runs on guideways such as tramways, elevated guide ways, exclusive railroads, and so on, with which structure balancing in weight of the vehicle is properly achieved, batteries can be cooled enough, battery rooms are completely sealed from the passenger room, and running stability of the vehicle is ensured.

To attain the object, the present invention proposes structure for mounting batteries in a guideway electric vehicle driven by a battery-driven motor and runs on guideways, wherein battery rooms for mounting battery modules comprised of a plurality of batteries are formed on a floor of the vehicle in both sides adjacent side walls of the vehicle respectively, each of the battery rooms being partitioned from the passenger cabin of the vehicle hermetically by a partition plate; suction openings for introducing outside air into the battery room are provided in the floor or side wall of the vehicle in each battery room, and exhaust openings for releasing air to the outside of the vehicle are provided in the side wall thereof in each battery room; whereby the battery module in each battery room can be cooled by outside air.

According to the invention, as the battery room is formed so that the batteries are mounted on the floor of the passenger cabin of the guideway electric vehicle, it is not necessary to reinforce the vehicle body to increase mechanical strength thereof, for the floor is designed originally to be strong enough to endure the weight of passengers. Therefore, floor construction of a conventional guideway electric vehicle to which electric power is supplied from outside of the vehicle can be adopted as it is without modification.

As the battery room is sealed from the passenger cabin by the partition plate, and the battery room is communicated to the outside of the vehicle via the suction openings and exhaust openings, batteries can be cooled by outside air and further the passenger cabin is prevented from receiving influence of battery electrolyte and inflammable gas developed from the battery electrolyte, thus safety for the passengers can be is secured.

It is preferable that each of the battery rooms protrudes from the side wall of the vehicle toward the passenger cabin in a longitudinal central portion of the vehicle.

With the construction, the batteries are located on both sides at central portion in longitudinal direction of the vehicle, so proper weight balancing of the vehicle is achieved and running safety of the vehicle is not deteriorated.

Further, as the batteries are located in the central portion in longitudinal direction, safety against collision to the front or rear of the vehicle is increased.

It is preferable that each of the battery rooms is formed under a passenger seat. In this way, as batteries are located under passenger seats in the central side portions of the vehicle, space in the passenger cabin is utilized effectively.

Further, it is preferable that a battery control device is provided in the battery room to monitor battery temperature, current, voltage, and control power supply from the battery module when abnormality is detected.

By this, the battery control device can be unitized with the battery module and handled as an integral part of the battery module, so the battery room effectively utilized and coping with modification of control specification and repairing of the battery control device are facilitated.

It is preferable that the suction openings and exhaust openings are formed in the side wall of the vehicle in the battery room. As the suction and exhaust openings are provided in each of the side walls of the vehicle in the battery room, the suction and exhaust openings can be formed without consideration of interference with devices and cables which are usually located under the floor, design freedom of determining location of the suction and exhaust openings can be increased, and the suction and exhaust openings can be located so that cooling effect of the battery module in the battery room is increased.

It is also suitable to provide the suction and exhaust openings in the floor of the vehicle in the battery room.

In this case, fear is eliminated that the air exhausted from the exhaust openings blows against passengers standing on the platform when the vehicle makes a stop at a station.

Further, in the invention, heat exchange pipes are provided to extend in the battery room and air ducts are provided to supply and return cooled air cooled by an air conditioner for passenger cabin to and from the heat exchange pipes, and the cooled air is introduced into the heat exchange pipes to cool air in the battery room.

With the construction, air in battery room is cooled by using cooled air supplied from the air conditioner for cooling the passenger cabin and the battery module is cooled by circulating the cooled air in the battery room, so the battery module is cooled to be allowed to operate in as more proper temperature circumstance as possible. As a result, load to the battery is alleviated and usage life of the battery module can be elongated.

It is suitable that a low temperature air generator for producing cold air by receiving pressurized air from a pressurized air source of the vehicle is provided to supply the cold air to the battery room to cool air in the battery room.

With the construction, cold air is produced using pressurized air for driving devices of the vehicle such as for example brakes of the vehicle. Concretively, cold air can be produced by supplying pressurized air to the low temperature air generator which ejects cold air and hot air by receiving pressurized air. The cold air is introduced into the battery room.

Therefore, cooling effect of the battery module is increased, and the battery module can be cooled more quickly so that the battery module operates in as more proper temperature circumstance as possible, as a result, load to the battery is alleviated usage life of the battery module can be elongated.

Further, as cold air can be produced easily by using pressurized air available in the vehicle without utilizing the air conditioners, so piping to introduce cooled air cooled by the air conditioners to the heat exchange pipes extending in the battery room is not needed, and the system can be simplified.

Further, it is preferable that a cooling control device is provided to select based on battery temperature, battery room temperature, and outside air temperature whether to adopt cooling of the battery module by introducing outside air from the suction openings and exhausting the air cooled the battery module from the exhaust openings, or cooling of the battery module by allowing air or cooled air in the battery room to circulate in the battery room.

By this, the battery module is cooled based on battery temperature, battery room temperature, and outside air temperature so that the batteries operates in as more proper temperature circumstance as possible, as a result usage life of the battery module can be elongated.

It is preferable that the batteries are arranged vertically in the battery room so that vertical circulation of air occurs in the battery room. With this arrangement of batteries in the battery room, cooling effect of the batteries is increased by heat convection effect.

According to the invention, structure for mounting batteries in a guideway electric vehicle driven by a battery-driven motor is provided, with which balancing in weight of the vehicle is properly achieved, batteries can be cooled enough, battery rooms are completely sealed from the passenger room, and as a result safety for the passenger is increased.

BRIEF DESCRIPTION OF THE DRAWINGS

FIGS. 5A to 5C are drawings showing the second embodiment, in which FIG. 5A is an elevational view showing the battery room in longitudinal section, FIG. 5B is a cross-sectional view of the battery room viewed in direction A in FIG. 5A, and FIG. 5C is a cross-sectional view of the battery room viewed in direction B in FIG. 5C.

FIGS. 10A to 10C are cross-sectional views along lines D-D in FIG. 8 and show air flow in the battery room, in which FIG. 10A is a case at start of operation of the vehicle in winter season, FIG. 10B is a case the batteries is used, i.e. they are in exothermal reaction in winter season, and FIG. 10C is a case in summer.

FIG. 13A to 13C are cross-sectional views along lines E-E in FIG. 11 and show air flow in the battery room, in which FIG. 13A is a case at start of operation of the vehicle in winter season, FIG. 13B is a case the batteries is used, i.e. they are in exothermal reaction in winter season, and FIG. 13C is a case in summer.

FIG. 16A to 16C are cross-sectional views along lines F-F in FIG. 14 and show air flow in the battery room, in which FIG. 16A is a case at start of operation of the vehicle in winter season, FIG. 16B is a case the batteries is used, i.e. they are in exothermal reaction in winter season, and FIG. 16C is a case in summer.

FIG. 19A to 19C are cross-sectional views along lines G-G in FIG. 17 and show air flow in the battery room, in which FIG. 19A is a case at start of operation of the vehicle in winter season, FIG. 19B is a case the batteries is used, i.e. they are in exothermal reaction in winter season, and FIG. 19C is a case in summer.

BEST EMBODIMENT FOR IMPLEMENTING THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

The First Embodiment

Figure 1:
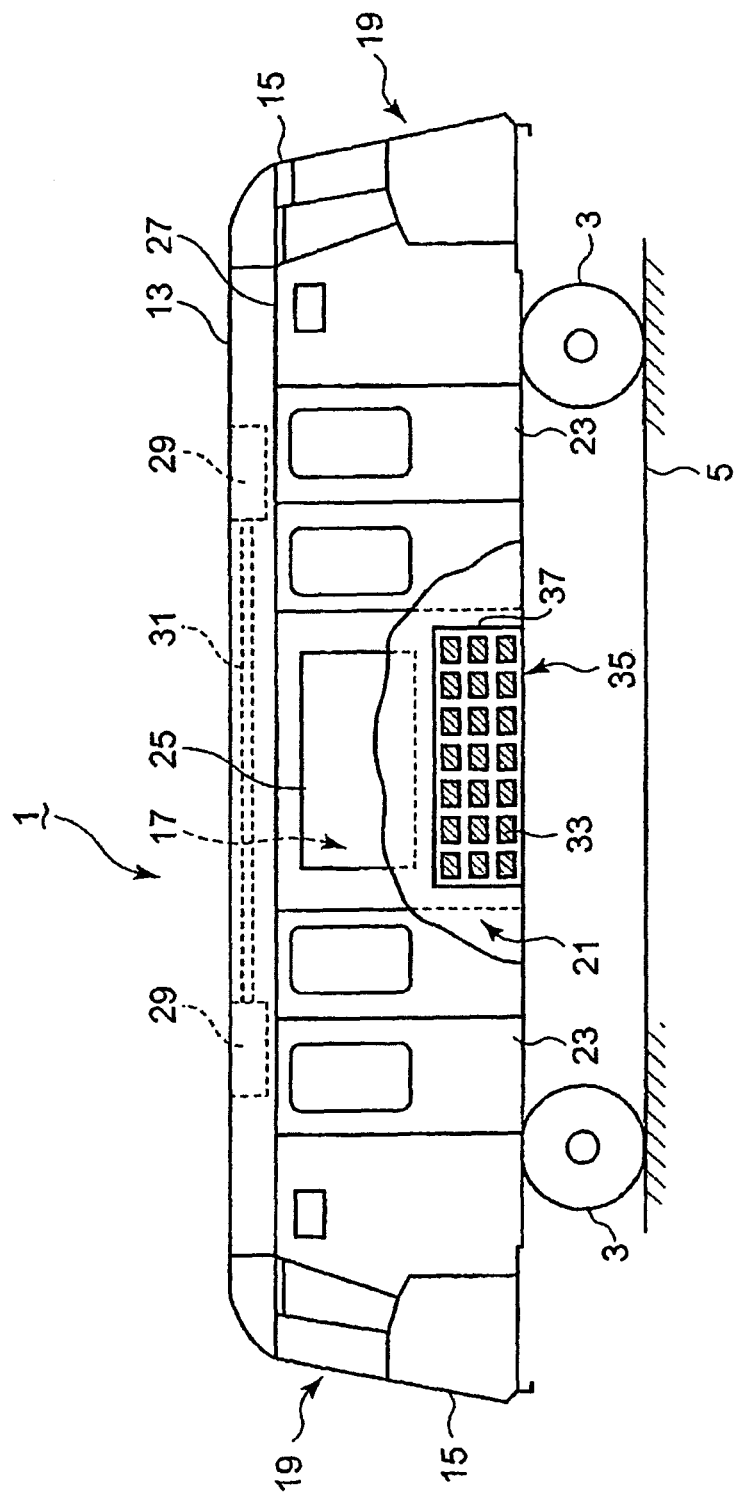
FIG. 1 is a side view of the electric vehicle driven by a battery-driven motor to which mounting structure of batteries of a first embodiment of the invention is applied with the mounting part revealed.

A first embodiment of the invention will be explained referring to FIGS. 1, 2, 3, 4A, and 4B. As an example, a guideway electric vehicle 1 used for transportation in air ports will be explained. Referring to FIG. 1, the vehicle 1 is an electric vehicle driven by electric power supplied from batteries 33. The vehicle 1 has four rubber-tired wheels 3 and runs along a guideway (roadway 5 in the embodiment).

Figure 2:
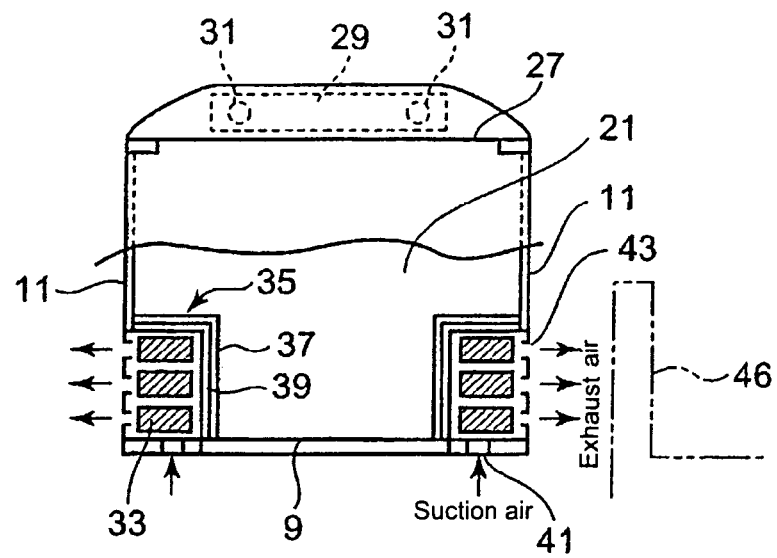
FIG. 2 is an elevational view showing the battery rooms in cross-section in the first embodiment.

As shown in FIGS. 1 and 2, an vehicle interior space 17 is formed by a floor 9, side walls 11, roof 13 and front and rear end walls 15. The vehicle interior space 17 is partitioned into a passenger cabin 21 and driver's cabins 19 (when the vehicle 1 is a manual driven vehicle) at the front and rear end parts of the interior space 17. Two slide doors 23 for passengers getting on and off are provided in the front and rear sides of the passenger cabin 21 and a window 25 are provided in the central part.

Air conditioners 29 are installed between the roof 13 and a ceiling 27 at positions symmetrical to each other about the center in longitudinal direction of the vehicle. Air cooled by the air conditioners 29 is introduced to an air duct 31 which has openings to serve as a diffuser, and cooled air is ejected into the passenger cabin 21 from the air duct 31 through the diffusing openings thereof into the passenger cabin 21.

An extrusive guideway is constructed such that a guide groove or guide wall not shown in FIG. 1 is provided along the roadway 5. Guide wheels attached to bogies of the vehicle 1 are received in the guide groove or contact the guide wall, and the vehicle 1 is steered by a steering mechanism connected to the guide wheels.

The vehicle can be automatically steered, also when an automatic steering mechanism connected to the guide wheels is not provided in the vehicle, by determining present position of the vehicle based on information received from position sensors located on the roadway 5 or from a GPS (Global Positioning System) and pulse signal of rotations of the rubber-tired wheels 3 or a drive motor, and determining steering pattern by collating guideway data memorized in a memory of travel control device with the determined present position of the vehicle.

The vehicle 1 is provided with a drive motor (electric motor) not shown in FIG. 1 and batteries 33 for feeding electric current to the motor are mounted in the vehicle. The batteries 33 are lithium-ion batteries. Each of them is a battery cell of 4 V for example and a plurality of them (8 batteries for example) are connected in series to develop tens of voltage. A plurality of battery groups connected in series is connected in parallel to compose a battery module. Hereafter, the module composed of the batteries 33 may be referred to as a battery module 33.

Battery modules 33 are accommodated in battery rooms 35 formed to protrude toward the passenger cabin 21 as can be seen in FIG. 2. Each of the battery rooms 35 is formed on the floor 9 and partitioned by a partition plate 37 to be sealed from the passenger cabin 21.

The partition plate 37 is made of metal plate, and the battery room 35 is formed to protrude toward the passenger cabin 21 in a cuboidal (rectangular parallelepiped) shape. Insulating material 39 such as glass wool for example is applied to the inside surface of the partition plate 37 so that heat transfer between the battery room 35 and passenger cabin 21 is prevented. By this, cooling of the battery module 33 is ensured and the passenger cabin 21 is prevented from the influence of heat in the battery room 35.

Figure 3:
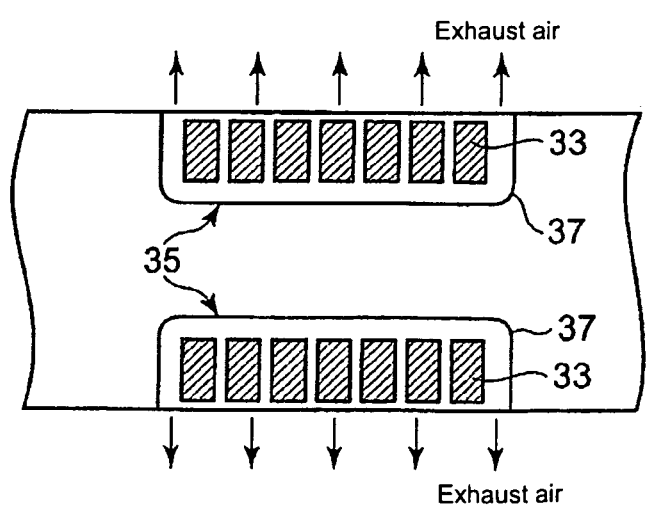
FIG. 3 is a plan view showing the battery rooms in horizontal section in the first embodiment.

In FIGS. 1, 2, and 3, the battery module 33 accommodated in the battery room 35 is composed of batteries piled vertically in three steps to form a column and seven columns are arranged in longitudinal direction of the vehicle. The number of steps and the number of columns may be properly determined in accordance with current intensity required by the electric motor.

The batteries 33 are stabilized by a fastener means in the battery room 35.

Air suction openings 41 for introducing outside air to the battery room 35 are provided to the floor 9, and exhaust openings 43 for letting out heated air from the battery room 35 are provided to the side wall 11. The number of suction openings 41 and that of exhaust openings 43 are properly determined in accordance with the number of batteries 33.

An exhaust fan or fans not shown in the drawing may be provided in the battery room 35 to force out heated air in the battery room 35.

As the battery module 33 is mounted in the battery room provided in the passenger cabin 21 on the floor 9 not on the roof, it is not necessary to reinforce the vehicle body to increase mechanical strength thereof, for the floor is designed originally to be strong enough to endure the weight of passengers. Therefore, floor construction of a conventional guideway electric vehicle to which electric power is supplied from outside of the vehicle can be adopted as it is.

As the battery room 35 is sealed from the passenger cabin 21 by the partition plate 37, heat insulated by the insulating material 39 applied to the inside surface of the partition plate 37, and the battery room 35 is communicated to the outside of the vehicle via the suction openings 41 and exhaust openings 43, batteries 33 can be cooled by outside air and further the passenger cabin 21 is prevented from receiving influence of battery electrolyte and inflammable gas developed from the battery electrolyte, thus safety for the passengers can be secured.

Further, each of the battery room 35 is formed to protrude into the passenger cabin 21 in the central portion of the vehicle body, so good weight balance of the vehicle is achieved and good running stability of the vehicle can be ensured.

It is permissible to provide battery rooms under the driver's cabins 19 in the front and rear of the vehicle 1 from the viewpoint of securing larger space for the passenger cabin by the sacrifice of safety from damage due to possible impingement of the front or rear of the vehicle.

Figure 4:
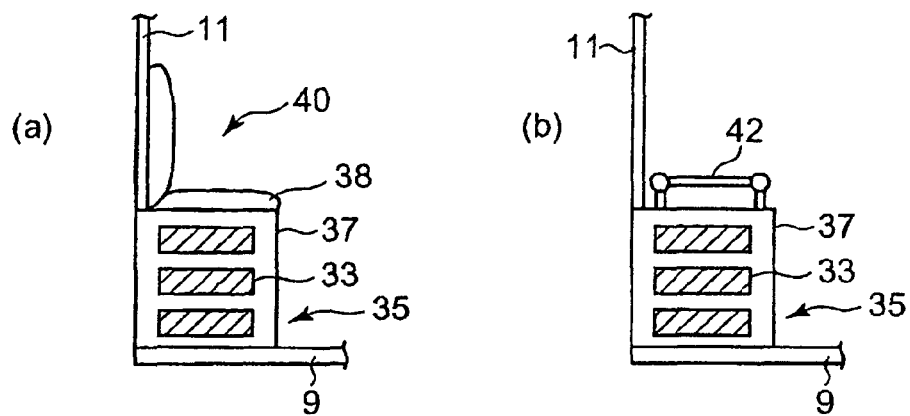
FIG. 4A is a drawing for explaining a case when the top of the battery room is utilized as a passenger seat.
FIG. 4B is a case when the top of the battery room is utilized as a parcel rack.

Utilization of the upper face of the battery room 35 will be explained referring to FIGS. 4A and 4B. The upper face of the partition plate 37 may be used as a seat 40 by providing a cushion 38 as shown in FIG. 4A or may be used as a parcel rack by providing a guardrail 42 as shown in FIG. 4B.

The Second Embodiment

Figure 5:
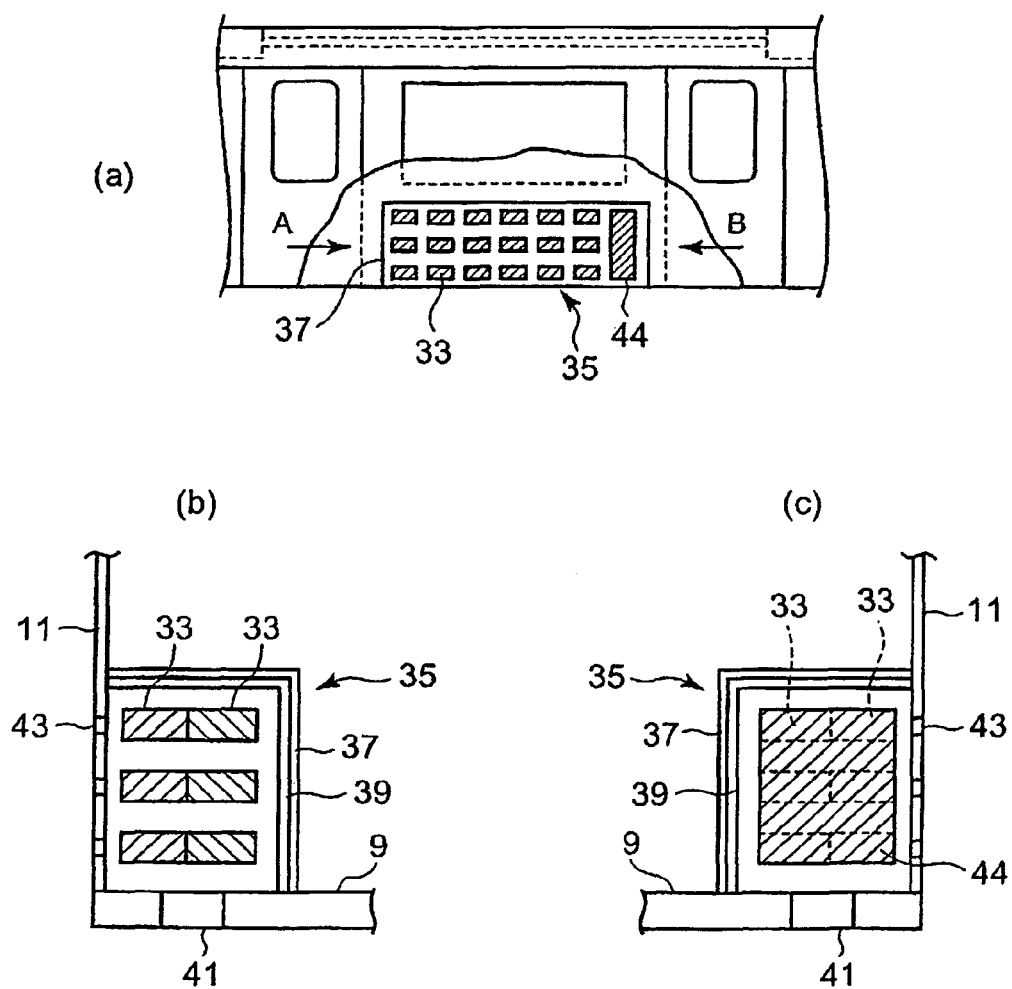

Next, a second embodiment of the invention will be explained with reference to FIGS. 5A, 5B, and 5C.

In this embodiment, the number of batteries is increased to two rows in width direction of the vehicle and a battery control device 44 is provided in the battery room 35. This is different from the first embodiment. Other than this is the same to the first embodiment and the same reference numerals are used for parts the same to those of the first embodiment and explanation is omitted.

As the total number of batteries 33 can be increased, life of batteries 33 until recharging can be elongated.

Further, the battery module 33 can be controlled by the battery control device 44 so that, when the battery module is in an abnormal state, for example in a state that temperature of the batteries (temperature of the battery electrolyte) is higher than the standard temperature, that electric current or voltage shows that the batteries are in overload or the batteries are excessively consumed, the information that the batter module is in an abnormal state is sent to the travel control center or vehicle driver and at the same time a proper measure such as to automatically reduce power supply from the battery module is taken.

By providing the battery control device 44 in the battery room 35 as an integral part of the battery module 33, the battery room 35 is effectively utilized and coping with modification of control specification and repairing of the control device 44 are facilitated.

The Third Embodiment

Figure 6:
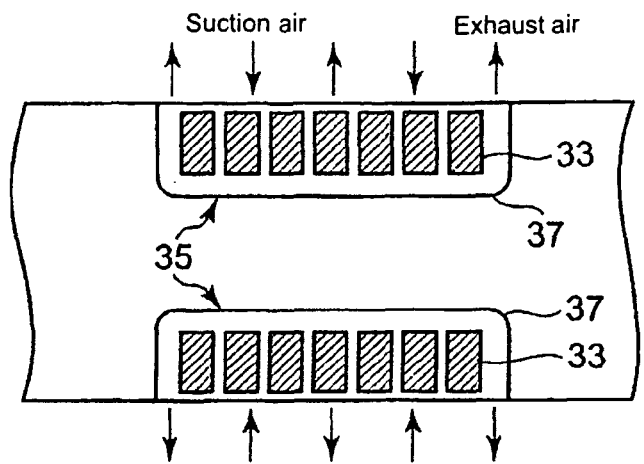
FIG. 6 is a plan view showing the battery rooms in horizontal section in the third embodiment.

A third embodiment of the invention will be explained referring to FIG. 6. In this third embodiment, suction openings 41 for taking in outside air to the battery room 35 and exhaust openings 43 for letting out heated air to the outside of the vehicle are formed in the side wall 11, different from the first embodiment in which the suction openings 41 are formed in the floor 9 and the exhaust openings 43 are formed in the side wall 11.

As the suction openings 41 are provided in the side wall 11 without being interrupted partly by devices and cables located under the floor 9 as may be when the suction openings 41 are provided in the floor 9, design freedom of determining location of the suction openings 41 and exhaust openings 43 can be increased and the openings 41, 43 can be located so that cooling effect of the battery module 33 in the battery room 35 is increased.

It is also suitable to provide the suction openings 41 and exhaust openings 43 in the floor 9 although not shown in the drawings. In this case, a protective barrier such as platform door 46 as shown in FIG. 2 is not needed to evade direct blowing of heated air from the battery room 35 against passengers standing on the platform when the vehicle makes a stop at a station.

The Fourth Embodiment

A fourth embodiment will be explained referring to FIGS. 7 to 10A~10C.

In the fourth embodiment, a part of cooled air cooled by the air conditioners 29 is introduced to the battery room 35 to flow in heat exchange pipes passing through the battery room 35, thereby cooling the battery module 33 indirectly by the cooled air flowing in the heat exchange pipes. Other than this is the same to the first embodiment and the same reference numerals are used for parts the same to those of the first embodiment and explanation is omitted.

Figure 7:
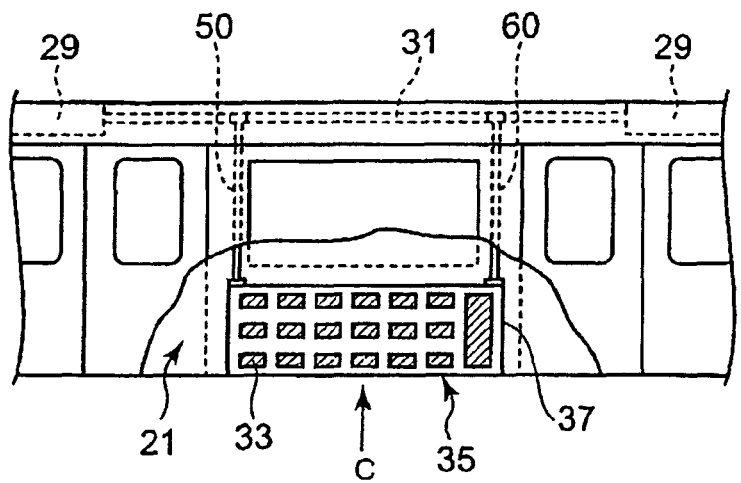
FIG. 7 is an elevational view showing the battery room in longitudinal section in the fourth embodiment.
Figure 8:
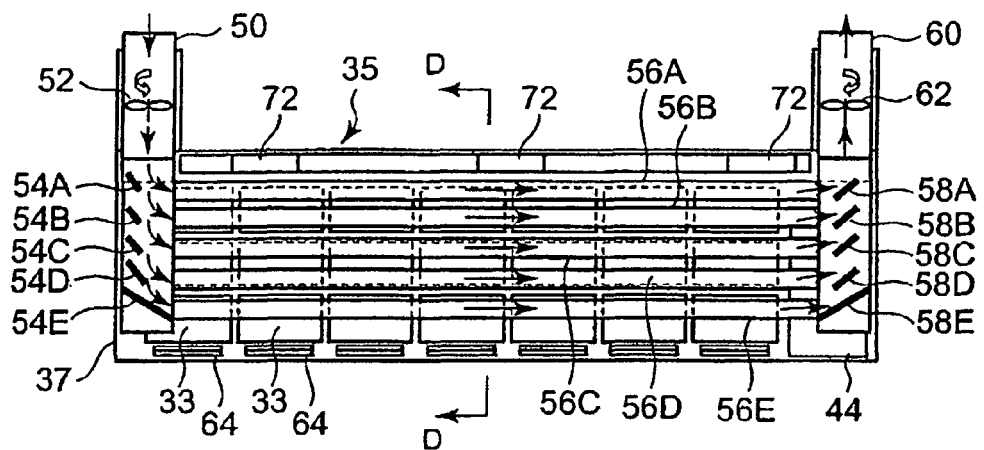
FIG. 8 is an enlarged detail of part C in FIG. 7 in longitudinal section.

As shown in FIG. 7, the air duct 31 having diffusing openings to serve as a diffuser to eject cooled air cooled by the air conditioners 29 evenly to the passenger cabin 21 is provided. A part of cooled air is introduced from the air duct 31 into a cooled air feed duct 50 extending downward from the air duct 31 along the side wall 11 to the battery room 35. A plurality of heat exchange pipes 56A, 56B, 56C, 56D, and 56E are located in the battery room 35 to extend in longitudinal direction thereof adjacent the battery fans 74. An end of each of the heat exchange pipes is connected to the cooled air feed duct 50, and other end thereof connects to a heated air outlet duct 60 which extends upward along the side wall 11 to be connected to the air conditioners 29 side. A fan 52 is located in the cooled air feed duct 50 to force the cooled air into the heat exchange pipes 56A~56E as shown in FIG. 8.

Inlet current plates 54A, 54B, 54C, 54D, and 54E are provided downstream of the suction fan 52 in the connecting part of the heat exchange pipes to the cooled air feed duct 50 to change flow direction of the cooled air as smoothly as possible. The inlet current plates 54A~54E are longer in length and smaller in inclination to face the pipes as they are lower in position so that the cooled air is introduced into the heat exchange pipes as smoothly as possible. The lowest current plate 54E for guiding the cooled air to the lowest heat exchange pipe 56E is longest in length and smallest in inclination.

Figure 9:
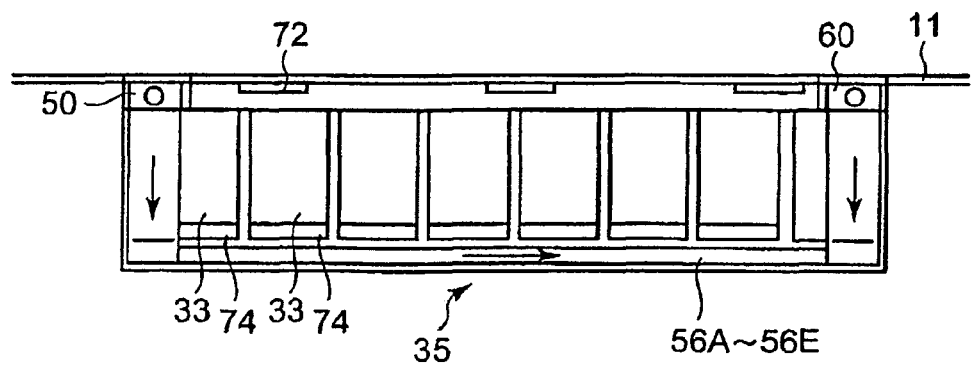
FIG. 9 is an enlarged detail of part C in FIG. 7 in horizontal section.
Figure 10:
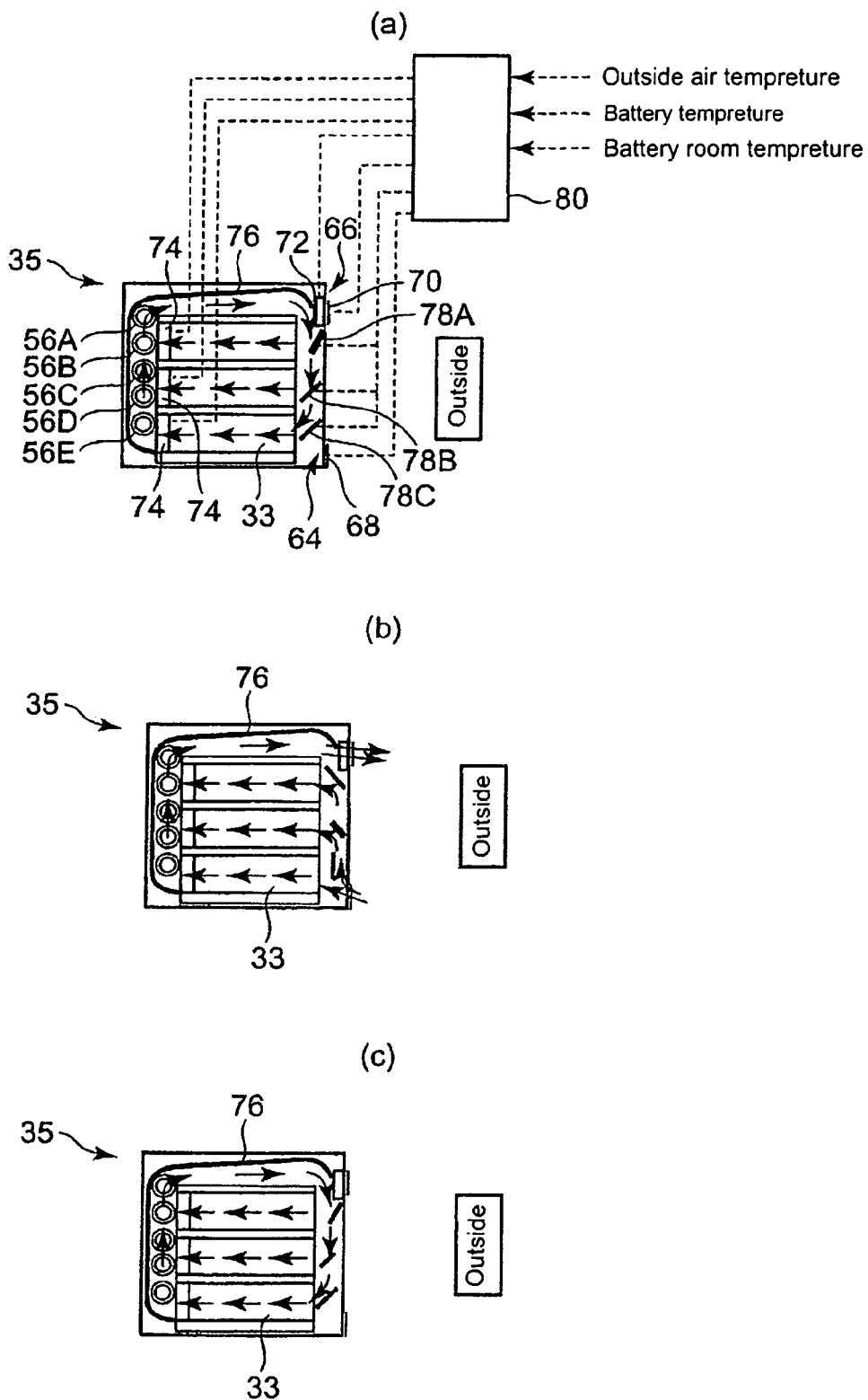

As can be seen in FIG. 9, the heat exchange pipes 56A~56E are located adjacent the inside surface of the longitudinally extending part of the partition plate 37. Cooling fins are provided to surround the outer periphery of each of the heat exchange pipes to increase heat exchange efficiency.

Outlet current plates 58A, 58B, 58C, 58D, and 58E are provided in the connecting part of outlet side ends of the heat exchange pipes to the heated air outlet duct 60 to change flow direction of the cooled air as smoothly as possible.

The inlet current plates 54A~54E and outlet current plates 58A~58E are fixed to the cooled air feed duct 50 and heated air outlet duct 60 respectively.

A fan 62 is located in the heated air outlet duct 60 to force out the heated air through the outlet duct 60 to return the heated air to the air conditioners 29 side.

In this way, cooled air cooled by the air conditioner 29 is introduced into the heat exchange pipes 56A~56E in the battery room 35 to cool the air in the battery room 35 to cool the battery module 33 indirectly.

As for cooling of the battery module 33 by introducing outside air into the battery room 35, a plurality of suction openings 64 and a plurality of outlet openings 66 are provided in the lower part and upper part respectively of the side wall 11 of the battery room 35 (see FIG. 10A). A suction open/close valve 68 and exhaust open/close valve 70 are provided to each of the suction openings 64 and each of the exhaust openings 66. Exhaust fans 72 are located at each of the exhaust openings 66.

Further, each of the batteries 33 is provided with a battery fan 74 as can be seen in FIGS. 9, 10A, 10B, and 10C. Air streams along the batteries 33 in width direction of the vehicle 1 are produced by the battery fans 74.

An air stream guide plate 76 is provided to cover the heat exchange pipes 56A~56E and the battery module 33, extending from the bottom of the battery room 35 to the exhaust openings 66 as shown in FIGS. 10A~10C so that the air energized by the battery fans 74 circulates in the battery room 35 when the suction open/close valves 68 and exhaust open/close valves 70 are closed.

Current plates 78A, 78B, and 78C are provided in the battery room 35 in the space between an end of the battery module 33 and the side wall of the vehicle. These current plates 78A~78C are changeable in inclination angle.

The current plates 78A~78C is inclined downward from the side wall as shown in FIGS. 10A and 10C to guide the air energized by the battery fans 74 to circulate in the battery room 35 when the suction open/close valves 66 and exhaust open/close valves 70 are closed. When the suction openings 64 and exhaust openings 66 are opened, the current plates 78A~78C is inclined upward from the side wall as shown in FIG. 10B to allow outside air to be sucked by the exhaust fans 72 and battery fans 74 into the battery room 35 and exhausted to the outside of the vehicle through the exhaust fans 72 and exhaust openings 66.

Further, a cooling control device 80 is provided. The control device 80 selects based on battery temperature, battery room temperature, and outside air temperature whether to adopt cooling of the battery module 33 by introducing outside air from the suction openings 64 and exhausting the air cooled by the battery module 33 from the exhaust openings 66, or cooling of the battery module 33 by allowing the air in the battery room 35 to circulate in the battery room 35, or cooling of the battery module 33 by introducing cooled air cooled by the air conditioners 29 into the heat exchange pipes 58A~58E in the battery room 35 to indirectly cool the air in the battery room 35 and allowing the air cooled in the battery room 35 to circulate in the battery room 35.

Opening/closing of the suction open/close valve 68, opening/closing of the exhaust open/close valve 70, inclination angle of the current plate 78A~78C, actuation of the exhaust fans 72, and actuation of the battery fans 74 are automatically controlled by the control device 80 so that battery temperature approaches a target temperature.

For example, when it is judged from outside air temperature that it is winter now and it is detected that battery temperature (battery electrolyte temperature) or battery room temperature is lower than outside air temperature which is often the case in early morning or at start of operation of the vehicle in winter, the control device 80 allows the suction open/close vales 68 and exhaust open/close valves 70 to be closed, the exhaust fans 72 to be not driven, the battery fans 74 to be driven, and the current plates 78A~78C to be inclined at a proper angle, so that the air enclosed in the battery room 35 circulates in the in the battery room 35 energized by the battery fans 74 as shown by arrows in FIG. 10A.

When it is judged from outside air temperature that it is winter now and it is detected that battery temperature or battery room temperature is higher than outside air temperature due to heat generation in the battery module 33, the control device 80 allows the suction open/close vales 68 and exhaust open/close valves 70 to be opened, the exhaust fans 72 to be driven, the battery fans 74 to be driven, and the current plates 78A~78C to be inclined at a proper angle so that outside air is introduced from the suction opening 64 into the battery room 35 and exhausted through the exhaust openings 66 to the outside as shown by arrows in FIG. 10B.

When it is judged from outside air temperature that it is summer now, the control device 80 allows a part of cooled air cooled by the air conditioners 29 to be introduced to the heat exchange pipes 96A~96D in the battery room 35 to cool the air in the battery room 35. In this case, the suction open/close vales 68 and exhaust open/close valves 70 are closed, the exhaust fans 72 are not driven, the battery fans 74 are driven, and the current plates 78A~78C are inclined at a proper angle, so that the air enclosed in the battery room 35 and cooled by a part of the cooled air supplied from the air conditioners 29 circulates in the in the battery room 35 energized by the battery fans 74 and passing the vertical air passage 118 as shown by arrows in FIG. 10C similarly as shown in FIG. 10A.

In this way, battery module 33 is properly cooled through the control by the cooling control device 80 in accordance with battery temperature, battery room temperature, and outside air temperature so that the battery module 33 is allowed to operate in as more proper temperature circumstance as possible, as a result usage life of the battery module can be elongated.

The Fifth Embodiment

A fifth embodiment will be explained referring to FIGS. 11~13. In the fifth embodiment, the batteries are mounted such that the battery fans 74 are on top of the batteries 33 and heat exchange pipes are provided above the battery fans (this arrangement of batteries is hereafter referred to a vertical arrangement), differing from the fourth embodiment in which the battery fans 74 are attached to lateral end sides of the batteries 33 (this arrangement of batteries is hereafter referred to a lateral arrangement) and heat exchange pipes 96A, 96B, 96C, and 96D are located adjacent the battery fans 74 on top of the to the batteries 33. Other than this is similar to the fourth embodiment.

Figure 11:
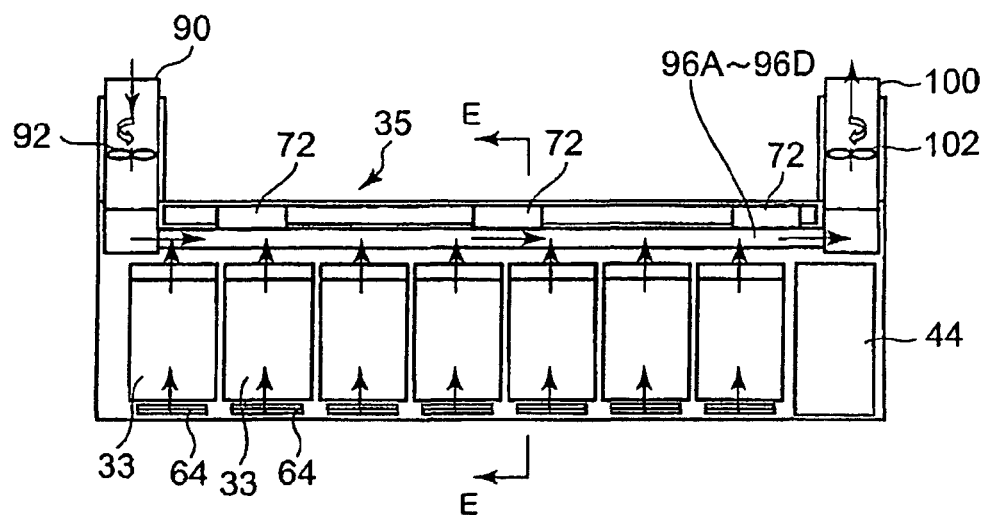
FIG. 11 shows the fifth embodiment and corresponds to enlarged detail of part C in FIG. 7 in longitudinal section.
Figure 12:
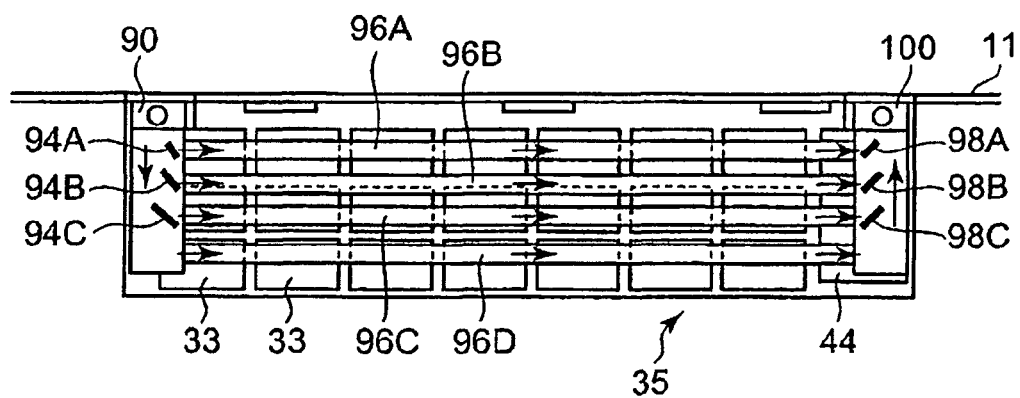
FIG. 12 shows the fifth-embodiment and corresponds to enlarged detail of part C in FIG. 7 in horizontal section.
Figure 13:
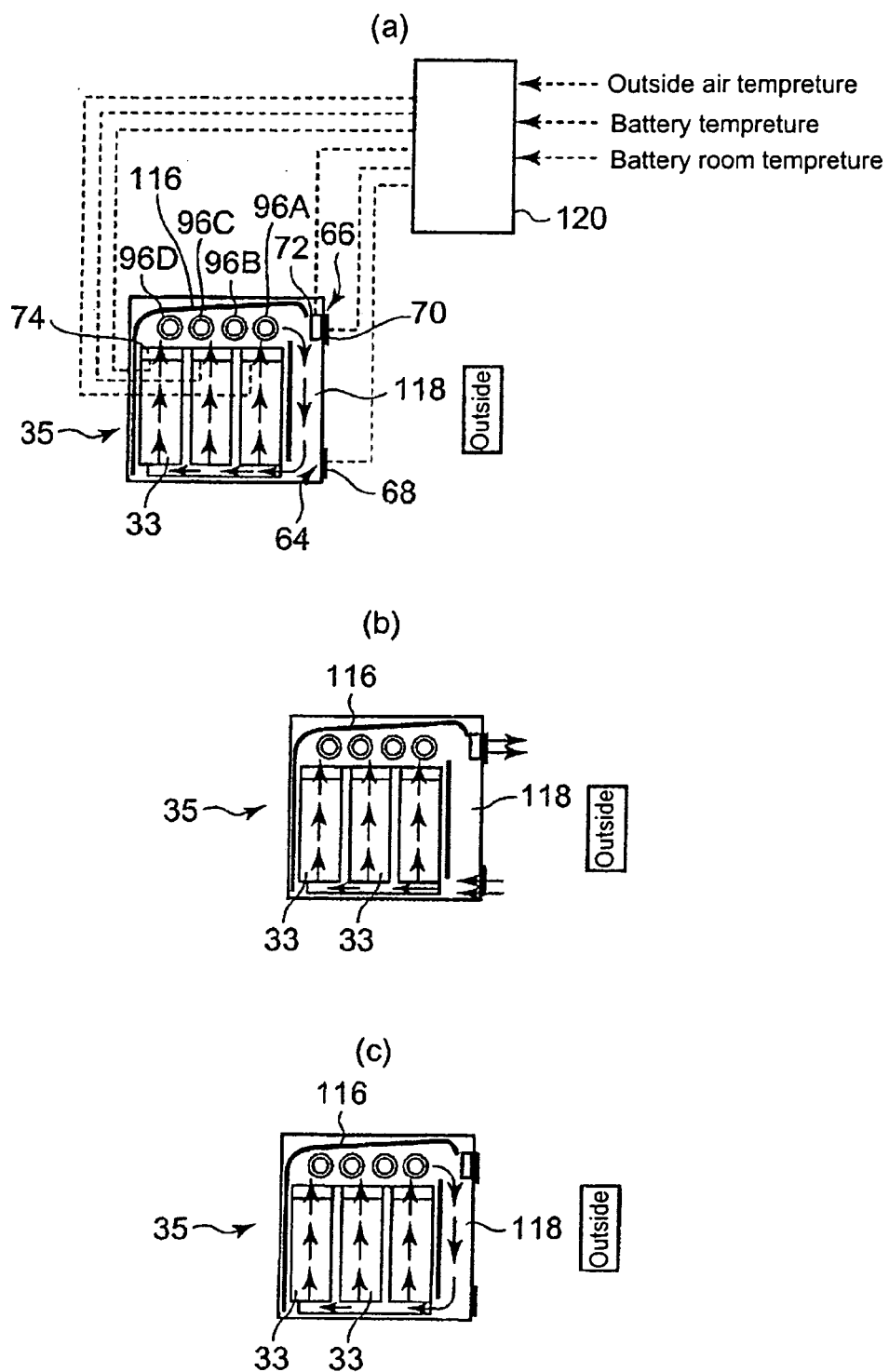

As shown in FIGS. 11 and 12, a cooled air feed duct 90 is connected to an end of the battery room 35. Heat exchange pipes extending in the battery room 35 in longitudinal direction of the vehicle are connected to the cooled air feed duct 90. A part of air cooled by the air conditioners 29 is introduced into the heat exchange pipes 96A~96D via the cooled air feed duct 90.

A fan 92 is located in the cooled air feed duct 90 to force the cooled air into the heat exchange pipes 96A~96D. Inlet current plates 94A, 94B, 94C are provided downstream of the suction fan 92 in the connecting part of the heat exchange pipes to the cooled air feed duct 90 to change flow direction of the cooled air as smoothly as possible. The inlet current plates 94A~94C are longer in length and smaller in inclination as they are remoter in position from the duct 90 toward the heat exchange pipe 96D so that the cooled air is introduced into the heat exchange pipes 96A~96D as smoothly as possible.

As can be seen in FIG. 11, the heat exchange pipes 96A~96D are located above the battery fans attached to the top end sides of the batteries 33.

Outlet current plates 98A, 98B, and 98C are provided in the connecting part of outlet side ends of the heat exchange pipes to the heated air outlet duct 100 to change flow direction of the cooled air as smoothly as possible.

The inlet current plates 94A~94C and outlet current plates 98A~98C are fixed to the cooled air feed duct 90 and heated air outlet duct 100 respectively.

A fan 102 is located in the heated air outlet duct 100 to force out the heated air through the outlet duct 90 to return the heated air to the air conditioners 29 side.

Upward flowing air stream can be produced by the battery fans 74 as shown in FIGS. 13A, 13B, and 13C. Air stream guide plate 116 is provided to cover the heat exchange pipes 96A~96D and the battery module 33, extending from the bottom of the battery room 35 to the exhaust openings 66 so that the air energized by the battery fans 74 circulates in the battery room 35 passing a vertical air passage 118 when the suction open/close valves 68 and exhaust open/close valves 70 are closed.

In the fifth embodiment, current plates corresponding to the current plate 78A~78C of the fourth embodiment are not provided. As the batteries 33 are vertically arranged, that is, the batteries 33 are placed so that the battery fans thereof are on top sides thereof, upward air steam is produced by the battery fans 74, the current plates 78A~78C to change the vertical flow direction of the air stream to lateral direction for each battery are not needed as is in the fourth embodiment.

Therefore, the construction of the battery room is simpler as compared with that of the fourth embodiment.

Further, a cooling control device 120 is provided. The control device 120 selects based on battery temperature, battery room temperature, and outside air temperature whether to adopt cooling of the battery module 33 by introducing outside air from the suction openings 64 and exhausting the air cooled the battery module 33 from the exhaust openings 66, or cooling of the battery module 33 by allowing the air in the battery room 35 to circulate in the battery room 35, or cooling of the battery module 33 by introducing cooled air cooled by the air conditioners 29 into the heat exchange pipes 58A~58E in the battery room 35 to indirectly cool the air in the battery room 35 and allowing the air cooled in the battery room 35 to circulate in the battery room 35.

The control device 120 controls automatically so that battery temperature approaches a target temperature in the similar way as does the control device of the fourth embodiment except for controlling the current plates 78A~78C of the fourth embodiment, for such current plates are not provided in the fifth embodiment.

For example, when it is judged from outside air temperature that it is winter now and it is detected that battery temperature or battery room temperature is lower than outside air temperature which is often the case in early morning or at start of operation of the vehicle in winter, the control device 12.0 allows the suction open/close vales 68 and exhaust open/close valves 70 to be closed, the exhaust fans 72 to be not driven, and the battery fans 74 to be driven, so that the air enclosed in the battery room 35 circulates in the battery room 35 energized by the battery fins 74 and passing the vertical air passage 118 as shown by arrows in FIG. 13A.

When it is judged from outside air temperature that it is winter now and it is detected that battery temperature or battery room temperature is higher than outside air temperature due to heat generation in the battery module 33, the control device 120 allows the suction open/close vales 68 and exhaust open/close valves 70 to be opened, the exhaust fans 72 to be driven, and the battery fans 74 to be driven, so that outside air is introduced from the suction openings 64 into the battery room 35 and exhausted to the outside through the exhaust openings 66 as shown by arrows in FIG. 13B.

When it is judged from outside air temperature that it is summer now, the control device 120 allows a part of cooled air cooled by the air conditioners 29 to be introduced to the heat exchange pipes 96A~96E in the battery room 35 to cool the air in the battery room 35. In this case, the suction open/close vales 68 and exhaust open/close valves 70 are closed, the exhaust fans 72 are not driven, and the battery fans 74 are driven, so that the air enclosed in the battery room 35 and cooled by a part of the cooled air supplied from the air conditioners 29 circulates in the battery room 35 energized by the battery fins 74 and passing the air vertical passage 118 as shown by arrows in FIG. 13C similarly as shown in FIG. 13A.

According to the embodiment, as the battery module 33 is located vertically in the battery room 35 such that battery fans 74 are positioned at the upper end of the battery module 33, air enclosed in the battery room 35 or air ingested from outside flows upward between the batteries energized by the battery fans 74, therefore, cooling effect of the battery module is increased by heat convection effect.

In this way, according to the fifth embodiment, battery module 33 is cooled properly through the control by the cooling control device in accordance with battery temperature, battery room temperature, and outside air temperature, so the battery module 33 is allowed to operate in as more proper temperature circumstance as possible, as a result usage life of the battery module can be elongated.

The Sixth Embodiment

A sixth embodiment will be explained referring to FIGS. 14~16.

In the fourth and fifth embodiments, air in the battery room 35 is cooled by introducing a part of cooled air cooled by the air conditioners 29 into the heat exchange pipes 56A~56E and 96A~96D respectively, whereas in the sixth embodiment and a seventh embodiment which will be explained later, pressurized air from an pressurized air source of the vehicle is introduced to a low temperature air generator 131 and cold air generated in the low temperature air generator 131 is directly introduced into the battery room 35 to cool the battery module 33. In the sixth embodiment, attitude of batteries 33 in the battery room 35 is the same as that in the fourth embodiment.

Figure 14:
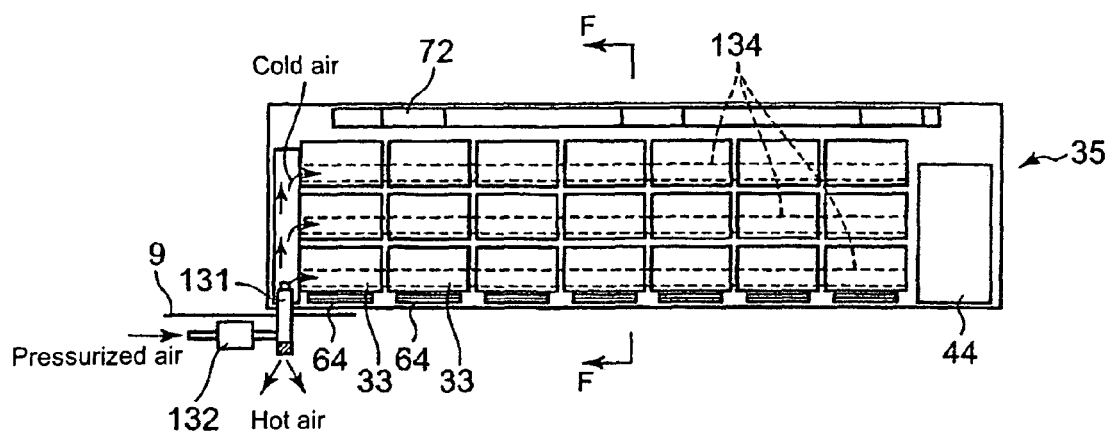
FIG. 14 shows the sixth embodiment and corresponds to enlarged detail of part C in FIG. 7 in longitudinal section.
Figure 15:
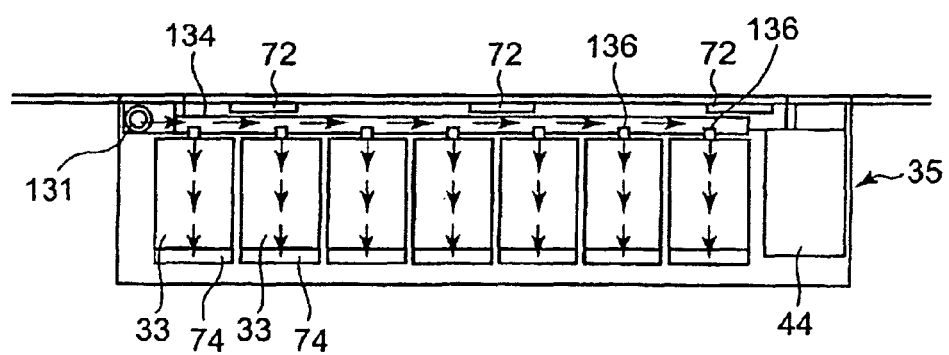
FIG. 15 shows the sixth embodiment and corresponds to enlarged detail of part C in FIG. 7 in horizontal section.
Figure 16:
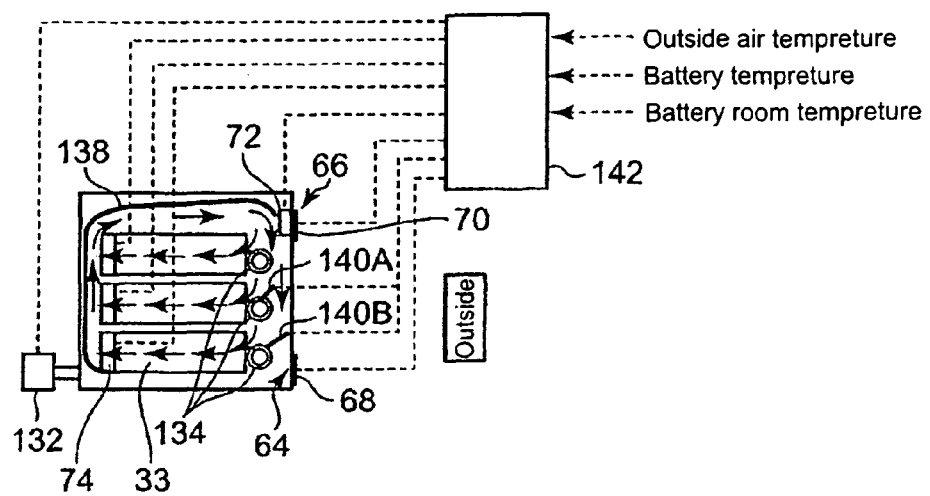
Figure 16:
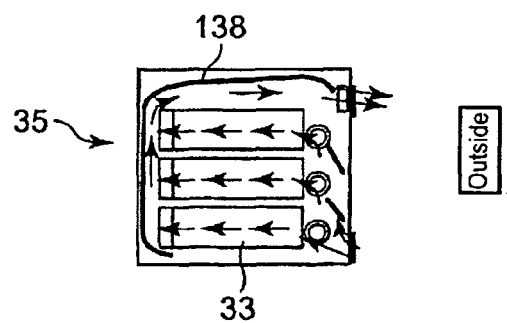
Figure 16:
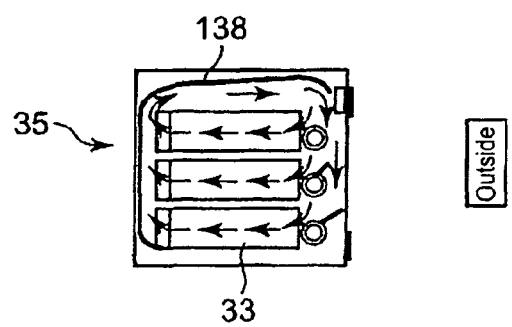

As shown in FIGS. 14 and 15, cold air produced by a low temperature air generator 131 is introduced into three cold air pipes 134 extending in longitudinal direction of the battery room 35 adjacent end sides of the batteries 33 opposite the battery fans 74. The cold air is produced using pressurized air used as a pressurized air for actuating devices such as air brakes of the vehicle. By supplying pressurized air to the low temperature air generator 131, cold and hot air are ejected from the air generator 131.

The low temperature air generator 131 is a cold air gun composed such that when pressurized air is introduced into a hollow pipe to swirl in the pipe, cold air is ejected from an end of the pipe and hot air is ejected from the other end of the pipe. It needs no refrigerant to produce cold air.

An electromagnetic valve 132 is attached at the entrance of pressurized air to the low temperature air generator 131, and introduction of cold air into the cold air pipes 134 is controlled through opening/closing of the electromagnetic valve 132.

Three cold air pipes 134 are located adjacent the ends of the batteries 33 opposite to the battery fans 74 in the embodiment. The cold air pipes 134 have cold air outlet openings 136 so that the cold air flows out from the cold air pipes 134 against the batteries 33 piled vertically in three steps.

An air stream guide plate 138 is provided to cover the battery module 33, extending from the bottom of the battery room 35 to the exhaust openings 66 as shown in FIGS. 16A, 16B and 16C. Current plates 140A and 140B are provided in the battery room 35 in the space between an end of the battery module 33 and the side wall of the vehicle. These current plates 140A and 140B are changeable in inclination angle.

Further, a cooling control device 142 is provided. The control device 142 selects based on battery temperature, battery room temperature, and outside air temperature whether to adopt cooling of the battery module 33 by introducing outside air from the suction openings 64 and exhausting the air cooled the battery module 33 from the exhaust openings 66, or cooling of the battery module 33 by allowing the air in the battery room 35 to circulate in the battery room 35, or cooling of the battery module 33 by allowing cold air produced by the low temperature air generator 131 into the battery room 35. In this way, the control device 120 controls automatically so that battery temperature approaches a target temperature.

For example, when it is judged from outside air temperature that it is winter now and it is detected that battery temperature or battery room temperature is lower than outside air temperature which is often the case in early morning or at start of operation of the vehicle in winter, the control device 142 allows the suction open/close vales 68 and exhaust open/close valves 70 to be closed, the exhaust fans 72 to be not driven, the battery fans 74 to be driven, the electromagnetic valve 132 to be closed, and the current plates 140A and 140B to be inclined at a proper angle, so that the air enclosed in the battery room 35 circulates in the in the battery room 35 energized by the battery fans 74 as shown by arrows in FIG. 16A.

When it is judged from outside air temperature that it is winter now and it is detected that battery temperature or battery room temperature is higher than outside air temperature due to heat generation in the battery module 33, the control device 142 allows the suction open/close vales 68 and exhaust open/close valves 70 to be opened, the exhaust fans 72 to be driven, the battery fans 74 to be driven, the electromagnetic valve 132 to be closed, and the current plates 140A and 140B to be inclined at a proper angle, so that outside air is introduced from the suction opening 64 into the battery room 35 and exhausted through the exhaust openings 66 to the outside as shown by arrows in FIG. 16B.

When it is judged from outside air temperature that it is summer now, the control device 142 allows the electromagnetic valve 132 to be opened so that cold air is ejected from the low temperature air generator 131 to be introduced into the cold air pipes 134. The batteries 33 are cooled by the cold air which flows out from the cold air pipes 134 toward the batteries 33 to directly cool the batteries 33. In this case, the suction open/close vales 68 and exhaust open/close valves 70 are closed, the exhaust fans 72 are not driven, the battery fans 74 are driven, and the current plates 140A and 140B are inclined at a proper angle, so that the cold air generated by the low temperature air generator 131 circulates in the in the battery room 35 together with the air in the battery room 35 energized by the battery fans 74 as shown by arrows in FIG. 16C similarly as shown in FIG. 16A.

As mentioned above, according to the sixth embodiment, the battery module 33 can be cooled directly by the cold air ejected from the low temperature air generator 131 through the control by the cooling control device 142 in accordance with battery temperature, battery room temperature, and outside air temperature, so the battery module 33 can be cooled more quickly and effectively and is allowed to operate in as more proper temperature circumstance as possible, as a result usage life of the battery module can be elongated.

Further, cold air for cooling the battery unit 33 can be obtained easily by the low temperature generator 131 using pressurized air available in the vehicle without utilizing the air conditioners 29, so piping to introduce a part of cooled air cooled by the air conditioners 29 from the air duct 31 located in the space between the ceiling 27 and roof 13 and to return the air to the space is not needed, and the system can be simplified.

The Seventh Embodiment

Figure 18:
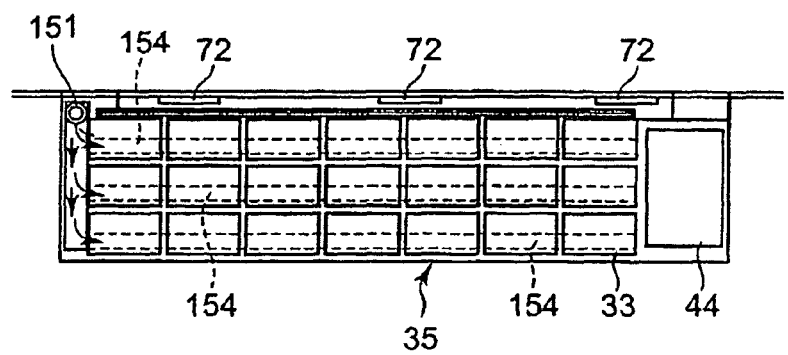
FIG. 18 shows the seventh embodiment and corresponds to enlarged detail of part C in FIG. 7 in horizontal section.
Figure 19:
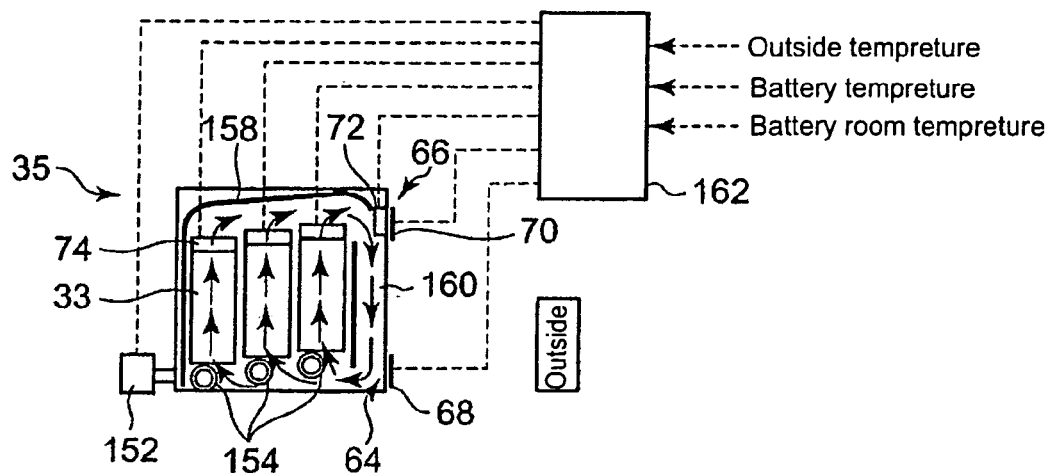
Figure 19:
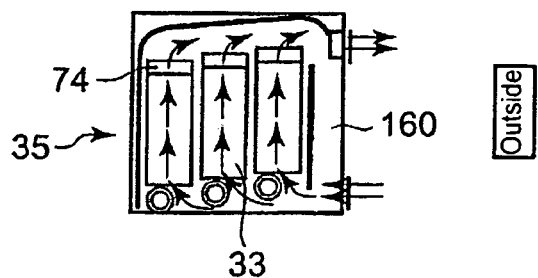
Figure 19:
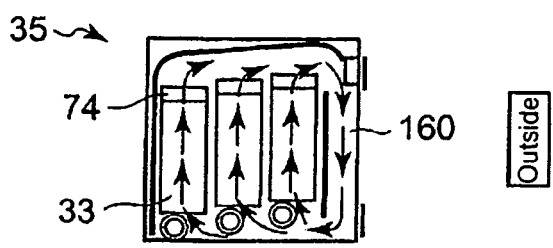
Figure 20:
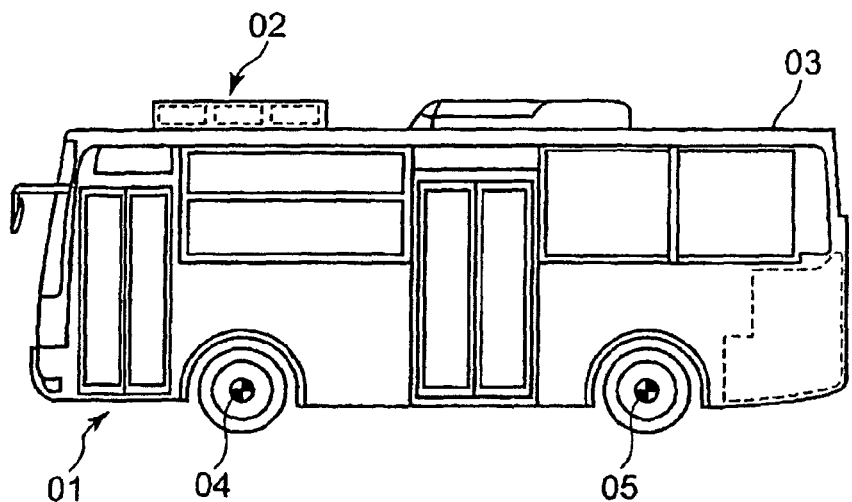
FIG. 20 is a side elevation showing battery mounting structure of a prior art.
Figure 21:
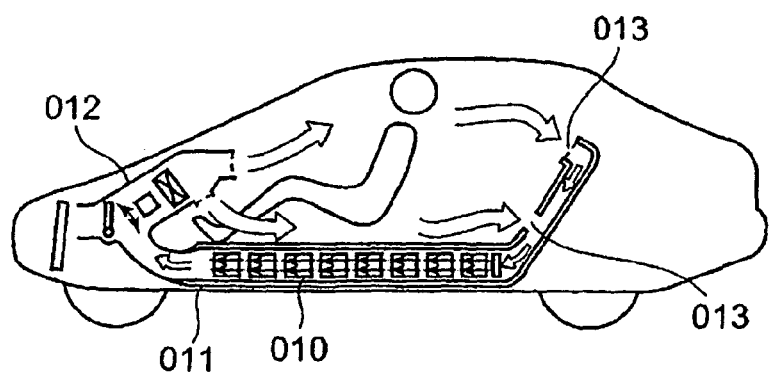
FIG. 21 is a schematic representation showing battery mounting structure of another prior art.

A seventh embodiment will be explained referring to FIGS. 17~19. In the seventh embodiment, the batteries 33 are arranged vertically as is in the fifth embodiment, differing from the sixth embodiment in which the batteries 33 are arranged laterally, and cold air pipes 154 are located adjacent the lateral ends of the batteries 33 opposite to the battery fans 74. Other than this is similar to the sixth embodiment.

Figure 17:
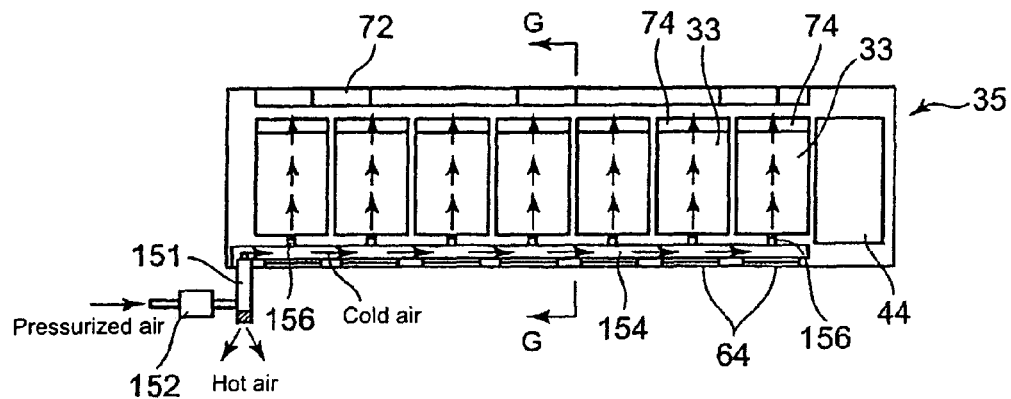
FIG. 17 shows the seventh embodiment and corresponds to enlarged detail of part C in FIG. 7 in longitudinal section.

As shown in FIG. 17, a low temperature air generator 151 is provided at an end part of the battery room 35, to which pressurized air is supplied to produce cold air. The cold air is introduced into the cold air pipes cold air pipes 154. An electromagnetic valve 152 is attached at the entrance of pressurized air to the low temperature air generator 151, and introduction of cold air into the cold air pipes 154 is controlled through opening/closing of the electromagnetic valve 152. The low temperature air generator 151 is the same as low temperature air generator 131 explained in the sixth embodiment.

The cold air introduced into the cold air pipes 154 extending along the floor 6 of the vehicle in the battery room 35 and flows out against the batteries 33 through cold air outlet openings 156 of the cold air pipes 154. In the embodiment, three cold air pipes 154 are provided under the batteries 33 to correspond to three rows of batteries. Three cold air pipes 134 are located adjacent the ends of the batteries 33 opposite to the battery fans 74 in the embodiment. The cold air pipes 154 have cold air outlet openings 156 so that the cold air flows out from the cold air pipes 154 against the batteries 33 arranged in three rows.

An air stream guide plate 138 is provided to cover the battery module 33, extending from the bottom of the battery room 35 to the exhaust openings 66 as shown in FIGS. 19A, 19B and 19C. A vertical air passage 160 is formed adjacent the side wall of the vehicle in the battery room 35 to allow the air in the battery room 35 to circulate.

Further, a cooling control device 162 is provided. The control device 162 selects based on battery temperature, battery room temperature, and outside air temperature whether to adopt cooling of the battery module 33 by introducing outside air from the suction openings 64 and exhausting the air cooled the battery module 33 from the exhaust openings 66, or cooling of the battery module 33 by allowing the air in the battery room 35 to circulate in the battery room 35, or cooling of the battery module 33 by allowing cold air produced by the low temperature air generator 151 and introduced into the battery room 35. In this way, the control device 120 controls automatically so that battery temperature approaches a target temperature. In this way, the control device 120 controls automatically so that battery temperature approaches a target temperature.

For example, when it is judged from outside air temperature that it is winter now and it is detected that battery temperature or battery room temperature is lower than outside air temperature which is often the case in early morning or at start of operation of the vehicle in winter, the control device 162 allows the suction open/close vales 68 and exhaust open/close valves 70 to be closed, the exhaust fans 72 to be not driven, the battery fans 74 to be driven, and the electromagnetic valve 152 to be closed, so that the air enclosed in the battery room 35 circulates in the in the battery room 35 energized by the battery fans 74 as shown by arrows in FIG. 19A.

When it is judged from outside air temperature that it is winter now and it is detected that battery temperature or battery room temperature is higher than outside air temperature due to heat generation in the battery module 33, the control device 162 allows the suction open/close vales 68 and exhaust open/close valves 70 to be opened, the exhaust fans 72 to be driven, the battery fans 74 to be driven, and the electromagnetic valve 132 to be closed, so that outside air is introduced from the suction opening 64 into the battery room 35 and exhausted through the exhaust openings 66 to the outside as shown by arrows in FIG. 19B.

When it is judged from outside air temperature that it is summer now, the control device 162 allows the electromagnetic valve 152 to be opened so that cold air is ejected from the low temperature air generator 151 to be introduced into the cold air pipes 134. The batteries 33 are cooled by the cold air which flows out from the cold air pipes 154 toward the batteries 33 to directly cool the batteries 33. In this case, the suction open/close vales 68 and exhaust open/close valves 70 are closed, the exhaust fans 72 are not driven, the battery fans 74 are driven, and the current plates 140A and 140B are inclined at a proper angle, so that the cold air generated by the low temperature air generator 151 circulates in the in the battery room 35 together with the air in the battery room 35 energized by the battery fans 74 as shown by arrows in FIG. 19C similarly as shown in FIG. 19A.

Increased battery cooling effect by introducing cold air produced by the low temperature air generator 151 into the battery room 35 to directly cool the battery module 33 is the same as that of the sixth embodiment. In the seventh embodiment, the battery module 33 is located vertically in the battery room 35 such that battery fans 74 are positioned at the upper end of the battery module 33, air enclosed in the battery room 35 or air ingested from outside flows upward between the batteries energized by the battery fans 74, therefore, cooling effect of the battery module is increased by heat convection effect, the battery module 33 can be cooled more quickly and effectively and is allowed to operate in as more proper temperature circumstance as possible, as a result usage life of the battery module can be elongated.

INDUSTRIAL APPLICABILITY

According to the invention, structure for mounting batteries in a guideway electric vehicle driven by a battery-operated motor is provided, with which balancing in weight of the vehicle is properly achieved, batteries can be cooled enough, battery rooms are completely sealed from the passenger room, and running stability of the vehicle is ensured.

The invention claimed is:

1. A guideway electric vehicle mounted with batteries, which is driven by a battery-driven motor and runs on guideways, comprising:

a plurality of battery modules formed by a plurality of batteries;

battery rooms for mounting the plurality of battery modules, the battery rooms being formed on a floor of the vehicle on two sides adjacent side walls of the vehicle respectively;

a partition plate provided to each battery room for separating the battery room from a passenger cabin of the vehicle hermetically;

suction openings for introducing outside air into the battery room provided in the floor or side wall of the vehicle in each battery room;

exhaust openings for releasing air to an outside of the vehicle provided in the side wall thereof in each battery room, whereby the battery modules in each battery room are cooled by outside air;

an air conditioner for the passenger cabin or a low temperature air generator mounted on the vehicle; and a cooling control device for selecting cooling of the battery module from cooling operation modes based on a battery temperature, a battery room temperature, and outside air temperature, the cooling operation modes including:

a first cooling operation mode that cools the battery rooms by introducing outside air from the suction openings and exhausting air cooling the battery module from the exhaust openings, a second cooling operation mode that cools the battery rooms by closing the suction openings and exhaust openings so as to circulate the air in the battery room, and a third cooling operation mode that cools the battery rooms by closing the suction openings and exhaust openings to supply cold air cooled by the air conditioner for the passenger cabin or cold air from the low temperature air generator to the battery rooms so as to cool the battery rooms directly or indirectly and circulate the cold air in the battery rooms, whereby the battery module is operated under a most suitable temperature circumstances.

2. The guideway electric vehicle mounted with batteries driven by a battery-driven motor according to claim 1, wherein each of said battery rooms protrudes from the side wall of the vehicle toward the passenger cabin in a longitudinal central portion of the vehicle.

3. The guideway electric vehicle mounted with batteries driven by a battery-driven motor according to claim 2, wherein each of said battery rooms is formed under a passenger seat.

4. The guideway electric vehicle mounted with batteries driven by a battery-driven motor according to claim 1, wherein a battery control device is provided in the battery room to monitor battery temperature, current, voltage in order to control power supply from the battery module when abnormality is detected.

5. The guideway electric vehicle mounted with batteries driven by a battery-driven motor according to claim 1, wherein said suction openings and exhaust openings are formed in the side wall of the vehicle in the battery room.

6. The guideway electric vehicle mounted with batteries driven by a battery-driven motor according to claim 1, wherein said suction openings and exhaust openings are formed in the floor of the vehicle in the battery room.

7. The guideway electric vehicle mounted with batteries driven by a battery-driven motor according to claim 1, further comprises heat exchange pipes through which the air cooled by the air conditioner for the passenger cabin is circulated so as to cool the air in the battery rooms.

8. The guideway electric vehicle mounted with batteries driven by a battery-driven motor according to claim 7, wherein the batteries are arranged vertically in the battery room so that vertical circulation of air occurs in the battery room.

9. The guideway electric vehicle mounted with batteries driven by a battery-driven motor according to claim 1, wherein the low temperature air generator produces the cold air by receiving pressurized air from a pressurized air source of the vehicle so as to supply the cold air generated by the low temperature air generator directly to the battery room to cool the air in the battery room.

10. The guideway electric vehicle mounted with batteries driven by a battery-driven motor according to claim 1, wherein the vehicle is arranged to run on exclusive guideways for the vehicle.

11. The guideway electric vehicle mounted with batteries driven by a battery-driven motor according to claim 1, wherein the vehicle is arranged to run along guide rails provided on general roadways.

* * * * *